3,042,674
XANTHENE AND THIAXANTHENE CYCLIC AMIDINES

John A. Faust, Santa Barbara, Calif., and Melville Sahyun, 316 Castillo St., Santa Barbara, Calif.; said Faust assignor to said Sahyun
No Drawing. Filed July 12, 1960, Ser. No. 42,195
6 Claims. (Cl. 260—251)

This invention relates to xanthene and thiaxanthene compounds and is more particularly concerned with cyclic amidine derivatives thereof.

The free base compounds of the present invention can be visualized as a xanthene or thiaxanthene ring structure which may be substituted by a halogen atom in the 2-position and which is substituted by a cyclic amidine in the 9-position of xanthene and 10-position of thiaxanthene. The cyclic amidine may be directly connected to the xanthene or thiaxanthene ring or may be connected via a lower alkylene group containing one, two or three carbon atoms. The amidine substituent is bonded through the carbon atom ortho or adjacent to both of the nitrogen atoms of the amidine cycle. The amidine function appears in a five (imidazoline) or six (tetrahydropyrimidine) member ring system. In addition, the amidine-containing ring may bear hydroxyl or methyl substituents on the carbon atoms other than that attached to the 9-position of the xanthene or to the 10-position of the thiaxanthene nucleus and a lower alkyl substituent on the nitrogen atom bearing the replaceable hydrogen atom.

The acid addition salts of the compounds described above are in general high melting, water soluble, white crystalline solids. These acid addition salts and the corresponding free bases are readily interconvertible, each to the other, and are useful in the isolation and preparation of each other. Both forms exhibit substantially the same pharmacological utility, namely: when evaluated in animals by standard test procedures, they exhibit beneficial sedative and depressant properties. Accordingly, both the free base form of these compounds and their corresponding acid addition salts fall within the scope of the appended claims.

The free bases of this invention have the structural formula:

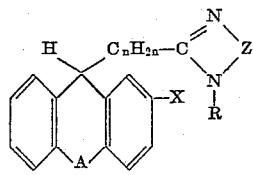

In the above formula, A may be oxygen or sulfur, X may be hydrogen or halogen, and R may be hydrogen or lower alkyl (alkyl radicals containing one to six carbon atoms such as, methyl, ethyl, isopropyl, amyl, and the like). $C_nH_{2n}$ represents the connecting link between the cyclic amidine moiety and the xanthene or thiaxanthene moiety where $n$ is an integer less than four and having the values three, two, one and zero. When $n$ is zero, there is no alkylene bridge and the cyclic amidine is bonded directly to the 9-position of the xanthene or to the 10-position of the thiaxanthene ring. Z represents a 1,2- or 1,3-lower alkylene radical which completes the imidazoline or tetrahydropyrimidine ring system respectively. In addition, these divalent alkylene radicals may bear methyl or hydroxyl substituents. Thus Z may be ethylene, propylene, isopropylene, isobutylene or their hydroxyl analogues hydroxyethylene, hydroxypropylene, hydroxyisopropylene and hydroxyisobutylene.

Alternately, the free bases of the present invention may be described as having the structural formula:

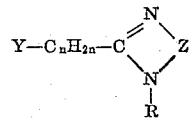

wherein Y represents the 9-position radical of the xanthene moiety or the 10-position of the thiaxanthene moiety, namely: 9-xanthyl, 10-thiaxanthyl, 9-(2-halo)xanthyl and 10-(2-halo)thiaxanthyl. Z, R and $n$ have the same values as in the previous formula.

The compounds of this invention may be prepared via the condensation of a 9-cyano- or 9-cyano lower alkylxanthene, 10-cyano, or 10-cyano lower alkylthiaxanthene, or their 2-halo derivatives with the salt of a lower alkylenediamine according to the equation

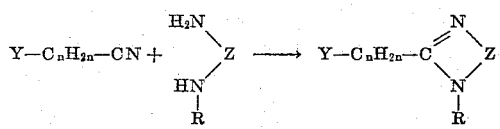

wherein Y, Z, R and $n$ have the same values as above.

The reactant nitrile, in turn, is most conveniently prepared by the condensation of the appropriately substituted 9-xanthydrol or 10-thiaxanthydrol with a salt of hydrocyanic acid or with a cyanoacetic acid or ester thereof according to the equations (a)   Y—OH+KCN→Y—CN (b)  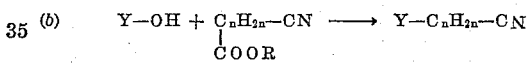

In method (b) where a cyanoacetic acid is used, decarboxylation of the condensate gives rise to the desired nitrile. When the corresponding ester is used (R equals lower alkyl), hydrolysis or saponification is required before decarboxylation. Obviously other conventional methods of introducing the cyano group, such as replacement of halogen, may be employed for the preparation of these reactants.

Referring again to the condensation of the nitrile and the alkylenediamine, the compounds of this invention are obtained as the free base or as their acid addition salts depending on the method of isolation used. The acid addition salt corresponding to the salt of the alkylenediamine reactant will occasionally crystallize from the reaction mixture but most frequently these compounds will be isolated in the form of their hydrochlorides. In any event, it is well-known to those skilled in the art of chemistry how to convert the free base to its acid addition salt or the acid addition salt to the free base.

The acids used to prepare the acid addition salts are preferably those whose anions are relatively innocuous to the animal organism in therapeutic doses of the salts. In such situations, the beneficial physiological properties inherent in the free base are not vitiated by side effects ascribable to the anion. Taking into account differences in degree of crystallinity or solubility and other properties more related to the technique of administration than the actual pharmacological utility, here both the free base and its acid addition salts exhibit the desired sedative and depressant properties and are equally useful; the choice of medium is governed mainly by convenience. The usual non-toxic acid addition salts are those derived from mineral acids such as hydrochloric acid, hydrobromic acid, hydroiodic acid, nitric acid, phosphoric acid and sulfuric acid; and organic acids such as acetic acid, citric acid, tartaric acid, lactic acid, benzoic acid and the like, giving the hydrochloride, hydrobromide, hydroiodide, nitrate, phosphate or acid phosphate, sulfate or bisulfate, acetate, citrate or acid citrate, tartrate or bitartrate, lactate and benzoate salts, respectively. The acid addition salt is most conveniently prepared by reaction of the appropriate acid with the free base in water, alcohol or non-polar solvents. Treatment of the acid addition salt with an inorganic base such as potassium carbonate regenerates the free base.

The following preparations and examples are illustrative of the compounds of the present inventions, and of the processes by which they and their intermediates may be made, and are not to be construed as limiting:

EXAMPLE 1

9-(4,5-Dihydro-2-Imidazolylmethyl)Xanthene Hydrochloride

*9-xanthenecyanoacetic acid.*—A solution of 10.0 grams (0.05 mole) of xanthydrol and 6.4 grams (0.075 mole) of cyanoacetic acid in 40 milliliters of glacial acetic acid was refluxed for 3 hours, cooled, and poured into 500 milliliters of water. The solid which separated was recrystallized from dilute acetic acid to yield 5.7 grams (43 percent) of 9-xanthenecyanoacetic acid melting at 160–163 degrees. Reported melting at 164–166 degrees (dec.). Beilstein, XVIII, p. 341.

*9-xantheneacetonitrile.*—A solution of 5.7 grams (0.021 mole) of 97-xanthenecyanoacetic acid in 20 milliliters of pyridine was heated at 100–105 degrees for 1.5 hours, cooled, and poured into 200 milliliters of water. The solid which separated weighed 3.5 grams (73 percent) and melted over a range of 127–134 degrees. Repeated recrystallization of a sample from ethanol yielded a white crystalline solid, melting at 141–142 degrees. Reported melting at 140 degrees. Beilstein, XVIII, p. 315.

*Analysis.*—Calculated for $C_{15}H_{11}ON$: N, 6.33. Found: N, 6.22.

*9-(4,5-dihydro-2-imidazolylmethyl)xanthene hydrochloride.*—A mixture consisting of 0.6 gram (0.0027 mole) of crude 9-xantheneacetonitrile and 0.7 gram (0.0030 mole) of ethylenediamine monoparatoluene sulphonate was heated between 160–175 degrees for 3 hours. The reaction mixture was extracted with 30 milliliters of dilute hydrochloric acid (5 percent). The solution was made basic and extracted with three 60 milliliter portions of ether. Upon acidification of the ether extract which had been dried over solid potassium hydroxide, a solid separated. The solid was recrystallized from isopropanol-ether to yield 0.4 gram (49 percent) of 9-(4,5-dihydro-2-imidazolylmethyl)xanthene hydrochloride melting at 242–244 degrees.

*Analysis.*—Calculated for $C_{17}H_{16}N_2O \cdot HCl$: N, 9.32. Found: N, 9.37.

Note: All temperatures given in these examples are reported in degrees centigrade.

EXAMPLE 2

9-(1,4,5,6-Tetrahydro-2-Pyrimidylmethyl)Xanthene Hydrochloride

A mixture consisting of 2.0 grams (0.009 mole) of 9-xantheneacetonitrile, 2.0 grams (0.0048 mole) of trimethylenediamine diparatoluenesulphonate, and 0.4 gram (0.0054 mole) of trimethylenediamine was heated at 180 degrees for 2 hours. The reaction mixture was digested with 100 milliliters of warm dilute hydrochloric acid (10 percent). A solid separated upon cooling which proved to be the 9-(1,4,5,6-tetrahydro-2-pyrimidylmethyl)xanthene hydrochloride. The filtrate was basified and extracted with three 75 milliliter portions of ether. Acidification of the ether extract which had been dried over solid potassium hydroxide gave more of the product which was recrystallized from 2 milliliters of water. The combined solids were recrystallized from isopropanol-ether to yield 1.25 gram (44 percent) of 9-(1,4,5,6-tetrahydro-2-pyrimidylmethyl)xanthene hydrochloride melting at 250–251 degrees.

*Analysis.*—Calculated for $C_{18}H_{18}N_2O \cdot HCl$: N, 8.90. Found: N, 8.65.

EXAMPLE 3

9-(1-Methyl-1,4,5,6-Tetrahydro-2-Pyrimidylmethyl) Xanthene Hydrochloride

A mixture consisting of 1.5 grams (0.0068 mole) of 9-xantheneacetonitrile and 1.8 grams (0.0070 mole) of N-methyl-1,3-propanediamine monoparatoluenesulfonate which was prepared by heating equivalent quantities of N-methyl-1,3-propanediamine and its bisparatoluenesulfonate salt (prepared by mixing equivalent quantities of ethanolic solutions of N-methyl-1,3-diaminopropane and paratoluenesulfonic acid, chilling, and washing the collected solid with ethanol-ether solution. A small sample recrystallized from ethanol-ether melted at 157–159 degrees. The crude product was sufficiently pure to be used for subsequent pyrimidine synthesis), was heated at 160–170 degrees for 1.5 hours. The reaction mixture was digested with 100 milliliters of warm dilute hydrochloric acid solution, filtered, and cooled. The acid solution was made basic and extracted with three 75 milliliter portions of ether. Upon acidification of the ether extract which had been dried over solid potassium hydroxide, a solid separated which was recrystallized twice from isopropanol-ether to yield 0.48 gram (22 percent) of 9-(1-methyl-1,4,5,6-tetrahydro-2-pyrimidylmethyl)xanthene hydrochloride melting at 234–236 degrees.

*Analysis.*—Calculated for $C_{19}H_{20}N_2O \cdot HCl$: N, 8.52. Found: N, 8.34.

EXAMPLE 4

10-(1,4,5,6-Tetrahydro-2-Pyrimidylmethyl)Thiaxanthene Hydrochloride

*Ethyl alpha-cyano-alpha-(10-thiaxanthyl)acetate.*—A mixture of 10.7 grams (0.05 mole) of 10-thiaxanthenol, 25.5 grams (0.2 mole) of ethyl cyanoacetate, 20 milliliters of glacial acetic acid, 50 milliliters of ethanol and 10 milliliters of water was heated in a boiling water bath for 3 hours. The cooled mixture was poured into water, and the solid which separated was isolated. It weighed 14.2 grams (92 percent) and melted at 130–131 degrees after recrystallization from ethanol.

*Analysis.*—Calculated for $C_{18}H_{15}NO_2S$: N, 4.53. Found: N, 4.53.

*Alpha-cyano-alpha-(10-thiaxanthyl)acetic acid.*—A mixture of 13.2 grams (0.044 mole) of the ester, 130 milliliters of 10 percent aqueous sodium hydroxide and 100 milliliters of methanol was stirred at 50–60 degrees for 1.5 hours with the simultaneous removal of some methanol by distillation. The mixture was diluted with water filtered and acidified to precipitate the acid which was collected on a filter and dried. Yield 10.8 grams (87 percent), melting at 190–191 degrees (dec.) after recrystallization from dilute ethanol.

*Analysis.*—Calculated for $C_{16}H_{11}O_2NS$: N, 4.98; neut. equiv., 281. Found: N, 5.03; neut. equiv., 277.

*Alpha-(10-thiaxanthyl)acetonitrile.*—A solution of 9.8 grams (0.035 mole) of the acid in 50 milliliters of pyridine was refluxed for 20 minutes, concentrated to about 25 milliliters, and poured into 500 milliliters of water. The gum which separated was triturated under dilute sodium hydroxide solution until it solidified, and the solid was recrystallized from ethanol. Yield 6.3 grams (75 percent), melting at 74–75 degrees.

*Analysis.*—Calculated for $C_{15}H_{11}NS$: N, 5.90. Found: N, 5.97.

*10-(1,4,5,6-tetrahydro-2-pyrimidylmethyl)thiaxanthene Hydrochloride.*—A mixture of 4.3 grams (0.018 mole) of the nitrile, 3.8 grams (0.009 mole) of 1.3-diaminopropane bis-tosylate, 0.66 grams (0.009 mole) of 1.3-diaminopropane and 10 milliliters of xylene was heated at 160–200 degrees for 1.5 hours. The xylene distilled from the mixture during this time. The residue was dissolved in dilute hydrochloric acid, the solution was filtered, and the filtrate was made alkaline. The oily base was extracted with ether, converted to the hydrochloride salt with hydrogen chloride and recrystallized from ethanol-ether. Yield, 2.4 grams (40 percent); melting at 212–213 degrees.

*Analysis.*—Calculated for $C_{18}H_{18}N_2S$: N, 8.47. Found: N, 8.35.

EXAMPLE 5

9-(1,4,5,6-Tetrahydro-2-Pyrimidyl)Xanthene Hydrochloride

*9-xanthenecarbonitrile.*—A mixture of 23.0 grams (0.116 mole) of xanthydrol, 15.0 grams (0.23 mole) of potassium cyanide, and 70 milliliters of glacial acetic acid was shaken at about 80–90 degrees in a pressure flask for 24 hours. The solid which separated from the cooled reaction mixture was collected, washed well with water and dried to give 15.7 grams (65 percent) of crude 9-xanthenecarbonitrile melting at 97–100 degrees. A small sample for analysis was recrystallized from ethanol and melted at 99–100 degrees.

*Analysis.*—Calculated for $C_{14}H_9NO$: N, 6.76. Found: N, 6.81.

*9-(1,4,5,6-tetrahydro-2-pyrimidyl)xanthene hydrochloride.*—A mixture consisting of 4.1 grams (0.02 mole) of 9-xanthenecarbonitrile, 5.0 grams (0.02 mole) of 1,3-diaminopropane mono-paratoluene-sulfonate prepared by heating equivalent quantities of 1,3-diaminopropane and its bisparatoluenesulfonate salt, and 15 milliliters of xylene was heated. After removing the xylene at 120–140 degrees under a mild vacuum, the heating was continued for 1 hour at 150–170 degrees. The reaction mixture was digested with 200 milliliters of hot dilute hydrochloric acid solution. A solid separated from the cooled aqueous extract; however, it proved to be the paratoluenesulfonate salt. A sample recrystallized from isopropanol-ether solution melted and decomposed at 275–277 degrees.

*Analysis.*—Calculated for $C_{24}H_{24}N_2O_4S$: N, 6.42. Found: N, 6.49.

The aqueous solution was made basic and extracted with four 50 milliliter portions of ether. After drying the ether extract over anhydrous potassium carbonate, it was acidified with ethereal hydrogen chloride. The solid which separated upon acidification was treated with activated charcoal and recrystallized from ethanol-ether to yield 1.4 grams (23 percent) of the hydrochloride melting and decomposing at 298–300 degrees.

*Analysis.*—Calculated for $C_{17}H_{16}N_2O \cdot HCl$: N, 9.32. Found: N, 9.22.

EXAMPLE 6

9-(1-Methyl-1,4,5,6-Tetrahydro-2-Pyrimidyl)Xanthene Hydrochloride

A mixture consisting of 3.1 grams (0.015 mole) of 9-xanthenecarbonitrile, 3.9 grams (0.015 mole) of N-methyl - 1,3 - diaminopropane mono-paratoluenesulfonate prepared by heating equivalent quantities of N-methyl-1,3-diaminopropane and its bisparatoluenesulfonate salt, and 15 milliliters of xylene was heated. After removing the xylene at 120–140 degrees under a mild vacuum, the heating was continued for 1.5 hours at 140–160 degrees. The reaction mixture was digested with 150 milliliters of hot dilute hydrochloric acid solution. The aqueous solution was made basic, extracted with four 50 milliliters portions of ether; and the ether extract was dried over solid sodium hydroxide. The solid which separated upon acidification of the ether solution with ethereal hydrogen chloride was treated with activated charcoal and recrystallized three times from ethanol-ether to yield 1.0 gram (21 percent) of 9-(1-methyl-1,4,5,6-tetrahydro-2-pyrimidyl)xanthene hydrochloride melting and decomposing at 250–252 degrees.

*Analysis.*—Calculated for $C_{18}H_{18}N_2O \cdot HCl$: N, 8.90. Found: N, 8.80.

EXAMPLE 7

9-(4,5-Dihydro-2-Imidazolyl)Xanthene Hydrochloride

A mixture consisting of 1.5 grams (0.0075 mole) of 9-xanthenecarbonitrile, 1.7 grams (0.0075 mole) of ethylene diamine monopara toluenesulfonate, and 10 milliliters of xylene was heated. After removing the xylene at 120–140 degrees under a mild vacuum, the heating was continued for 1.5 hours at 150–160 degrees. The reaction mixture was digested with 75 milliliters of hot dilute hydrochloric acid and the aqueous solution was made basic. The paratoluenesulfonate salt of 9-(4,5-dihydro-2-imidazolyl)xanthene crystallized out from the cooled aqueous extract. A sample recrystallized from ethanol melted and decomposed at 214–216 degrees.

*Analysis.*—Calculated for $C_{23}H_{22}N_2O_4S$: N, 6.63. Found: N, 6.67.

The organic base was extracted with two 25 milliliters portions of chloroform, and the chloroform extract was dried over anhydrous potassium carbonate. The solid which separated upon acidification of the chloroform solution with ethereal hydrogen chloride was purified by digesting with a minimum amount of isopropanol to dissolve the colored impurities, and the insoluble material was recrystallized twice from isopropanol-ether to yield 0.3 gram (14 percent) of 9-(4,5-dihydro-2-imidazolyl)-xanthene hydrochloride melting and decomposing at 280–281 degrees.

*Analysis.*—Calculated for $C_{16}H_{14}N_2O \cdot HCl$: N, 9.77. Found: N, 9.80.

EXAMPLE 8

2-Bromo-9-(1,4,5,6-Tetrahydro-2-Pyrimidyl)Xanthene Hydrochloride

*2.7-dibromo xanthone.*—A mixture of 19.6 grams (0.1 mole) of xanthone and 62.5 grams (0.39 mole) of bromine was ground under water in a mortar until most of the bromine had been absorbed. The solid was washed with water, dried and recrystallized from benzene to obtain 20 grams (56 percent) of the dibromo compound, melting at 211–212 degrees (reported melting point 213 degrees, Beilstein, XVII, 356).

*2-bromo-9-xanthenol.*—The ketone (30 grams) was reduced with sodium amalgam (6.9 grams of sodium and 37 milliliters of mercury) in the manner described for the reduction of xanthone to xanthydrol in Organic Syntheses, coll. vol. I, p. 554. The ethanolic solution was carefully diluted with water to precipitate, in two crops, 13.8 grams of material, melting at 148–151 degrees, the identity of which was not established. Further dilution of the mother liquor of this material precipitated 9 grams of solid, which melted over a wide range (90–100 degrees). Recrystallization from ethanol yielded material melting at 76–78 degrees, the analysis of which indicated it to be the desired 2-bromo-9-xanthenol.

*2-bromo-9-xanthyl cyanide.*—A mixture of 6.8 grams of the crude xanthenol, 4.0 grams of potassium cyanide and 50 milliliters of glacial acetic acid, contained in a pressure bottle, was shaken at 60 degrees for 12 hours. The clear greenish solution was poured into water and extracted with cholorform. The chloroform solution was concentrated, diluted with heptane and filtered to remove a small amount of solid material. Removal of the solvent left 5.2 grams of an oil which could not be obtained crystalline.

*2-bromo-9-(1,4,5,6-tetrahydro - 2 - pyrimidyl)xanthene hydrochloride.*—A mixture of 4 grams (0.014 mole) of the above nitrile, 4.2 grams (0.01 mole) of 1,3-diaminopropane bis-tosylate and 0.74 gram (0.1 mole) of 1,3-diaminopropane was heated at 190–200 degrees for 1.5 hours. The cooled mass was extracted with 200 milliliters of hot, dilute hydrochloric acid and the aqueous extract was filtered, cooled and made alkaline. The precipitated base was extracted with chloroform, the chloroform solution was acidified with hydrogen chloride and distilled to a solid residue. Repeated recrystallization of this solid from isopropyl alcohol-ether yielded 0.6 gram of product, melting at 317–319 degrees (dec.).

Analysis.—Calculated for $C_{17}H_{15}BrN_2O \cdot HCl$: N, 7.38. Found: N, 7.64.

EXAMPLE 9

9-(1-Methyl-4,5-Dihydro-2-Imidazolylmethyl)Xanthene Hydrochloride

A mixture of 2.4 grams (0.01 mole) of 9-xanthylacetonitrile, 2.1 grams (0.005 mole) of N-methylethylenediamine bis-tosylate, 0.4 gram (0.005 mole) of N-methylethylenediamine was heated at 175–180 degrees for 1.5 hours and cooled. The taffy-like reaction mixture was digested with hot dilute hydrochloric acid, filtered and the aqueous solution was rendered alkaline. The liberated base was extracted with ether, converted to the hydrochloride and recrystallized several times from isopropyl alcohol-ether. The yield of pure material was 0.7 gram, melting at 227–228 degrees.

Analysis.—Calculated for $C_{18}H_{18}N_2O \cdot HCl$: N, 8.90. Found: N, 9.10.

EXAMPLE 10

10-(4,5-Dihydro-2-Imidazolylmethyl)Thiaxanthene Hydrochloride

A mixture of 1.5 grams (0.0063 mole) of alpha-(10-thiaxanthyl)acetonitrile, 1.5 grams (0.0063 mole) of ethylenediamine mono-tosylate and 10 milliliters of toluene was gradually heated to 190 degrees over a period of 2 hours during which time the toluene was permitted to distill from the mixture. The cooled residue was taken up in dilute hydrochloric acid, and mixture was filtered and the filtrate was made alkaline. The oily base was extracted with ether, converted to the hydrochloride salt with hydrogen chloride and recrystallized from isopropanol-ether. Yield, 1.1 grams (55 percent), melting at 237–238 degrees (dec.) after a subsequent recrystallization.

Analysis.—Calculated for $C_{17}H_{16}N_2S \cdot HCl$: N, 8.84. Found: N, 8.82.

EXAMPLE 11

10-(4-Methyl-1,4,5,6-Tetrahydro-2-Pyrimidylmethyl)-Thiaxanthene Hydrochloride

Prepared from alpha-(10-thiaxanthyl)acetonitrile, 1,3-diaminobutane bis-tosylate and, 1,3-diaminobutane in toluene at 170–185 degrees in substantially the same manner as described in Example 4. The yield was 33 percent, melting at 216–217 degrees (dec.).

Analysis.—Calculated for $C_{19}H_{20}N_2S \cdot HCl$: N, 8.12. Found: N, 7.90.

EXAMPLE 12

10-(5-Hydroxy-1,4,5,6-Tetrahydro-2-Pyrimidylmethyl)-Triaxanthene Hydrochloride

Prepared from alpha-(10-thiaxanthyl)acetonitrile, 1,3-diamino-2-propanol bis-tosylate, 1,3-diamino-2-propanol and toluene in substantially the same manner as described in Example 4. The yield was 50 percent, melting at 279–280 degrees (dec.) after recrystallization from ethanol-ether.

Analysis.—Calculated for $C_{18}H_{18}N_2OS \cdot HCl$: N, 8.08. Found: N, 8.03.

EXAMPLE 13

10-(1-Methyl-1,4,5,6-Tetrahydro-2-Pyrimidylmethyl)-Triaxanthene Hydrochloride

Prepared in substantially the same manner as described in Example 4 but using alpha-(10-thiaxanthyl)acetonitrile, N-methyl-1,3-diaminopropane bis-tosylate, N-methyl-1,3-diaminopropane and toluene. The yield was 29 percent, melting at 244–245 degrees, after recrystallization from isopropyl alcohol-ether.

Analysis.—Calculated for $C_{19}H_{20}N_2S \cdot HCl$: N, 8.12. Found: N, 7.94.

EXAMPLE 14

2-Chloro-10-(1,4,5,6-Tetrahydro-2-Pyrimidylmethyl)-Thiaxanthene Hydrochloride

Alpha-(2-chloro-10-thiaxanthyl)acetonitrile.—This compound was obtained as an oil from the same series of reactions used to synthesize alpha-(10-thiaxanthyl)acetonitrile. The intermediate chlorine-containing products were also oils which were not obtained crystalline and were not analyzed.

2-chloro-10-(1,4,5,6-tetrahydro-2-pyrimidylmethyl)thiaxanthene hydrochloride.—A mixture of 6.7 grams (0.025 mole) of the above nitrile, 4.0 grams (0.01 mole) of 1,3-diaminopropane bis-tosylate, 0.8 gram (0.011 mole) of 1,3-diaminopropane and 20 milliliters of xylene was heated at 155–210 degrees for 3 hours, allowing the xylene to distill from the mixture during this time. The cooled residue was digested in 300 milliliters of hot dilute hydrochloric acid and filtered. The filtrate was made alkaline, the base was extracted with ether and converted to the hydrochloride salt with hydrogen chloride. The crude material weighed 3.6 grams (39 percent) and melted at 279–280 degrees (dec.) after recrystallization from ethanol-ether.

Analysis.—Calculated for $C_{18}H_{17}ClN_2S \cdot HCl$: N, 7.67; Cl$^-$, 9.71. Found: N, 7.58; Cl$^-$, 9.82.

EXAMPLE 15

10-[3-(1,4,5,6-Tetrahydro-2-Pyrimidyl)Propyl]-Triaxanthene Hydrochloride 10-(3-bromopropyl)thiaxanthene.—To a solution of butyl lithium at −10 degrees, prepared from 1.5 grams (0.22 gram atom) of lithium as described in J. Am. Chem. Soc., 71, 1499 (1949), there was added 15 grams (0.075 mole) of powdered thiaxanthene, and the mixture was refluxed for 3 hours under an atmosphere of dry nitrogen. The dark red mixture was then siphoned, in portions, by means of nitrogen pressure into a stirred solution of 60 grams (0.3 mole) of 1,3-dibromopropane in 300 milliliters of dry ether at room temperature. During the addition, which was over a period of 15 minutes, the deep red color of the organo-metallic solution was immediately discharged and a white precipitate formed. The mixture was stirred and refluxed for 1 hour and filtered to remove about 4 grams of solid, the identity of which was not established. The yellow filtrate was washed with water, then with dilute hydrochloric acid and dried over magnesium sulfate. Fractional distillation yielded 45 grams of unreacted 1,3-dibromopropane, boiling at 65 degrees (20 millimeters), 2.5 grams of unreacted thiaxanthene, boiling at 140–168 degrees (0.7 millimeter) and 11 grams of the desired product, boiling at 178–182 degrees (0.7 millimeter).

10-(3-cyanopropyl)thiaxanthene.—A mixture of 6.4 grams (0.02 mole) of 10-(3-bromopropyl)thiaxanthene, 3 grams (0.046 mole) of potassium cyanide, 40 milliliters of ethanol and 5 milliliters of water was refluxed for 7 hours. The alcohol was removed by distillation and the residue was partitioned between water and ether. The dried ether solution was distilled to obtain 3.2 grams (75 percent) of the nitrile as a viscous yellow oil, boiling at 186–190 degrees (0.6 millimeter).

Analysis.—Calculated for $C_{17}H_{15}NS$: N, 5.28. Found: N, 5.05.

10-[3-(1,4,5,6-tetrahydro-2-pyrimidyl)propyl]thiaxanthene hydrochloride.—A mixture of 3 grams (0.011 mole) of the nitrile, 3 grams (0.007 mole) of 1,3-diaminopropane bis tosylate and 0.5 gram (0.007 mole) of 1,3-diaminopropane was heated at 170–200 degrees until the evolution of ammonia had practically ceased (1 hour). Dilute sodium hydroxide and ether were added and the mixture was stirred to obtain two clear layers. The ether layer was separated, washed, dried and treated with ethereal hydrogen chloride. The oil which separated was dissolved in isopropyl alcohol and the solution diluted with ether. The hydrochloride separated as a white crystalline solid. Yield 1 gram (25 percent) melting at 205–206 degrees.

*Analysis.*—Calculated for $C_{20}H_{22}N_2S \cdot HCl$: N, 7.81; $Cl^-$, 9.88. Found: N, 7.77; $Cl^-$, 9.87.

As stated previously, the compounds of our invention exhibit beneficial sedative and depressant properties. This is demonstrated by pharmacological testing on experimental animals. For example, 10-(1,4,5,6-tetrahydro-2-pyrimidylmethyl)thiaxanthene hydrochloride produced marked depression and somnolence in the test animal at doses in the range of 20 to 50 milligrams per kilogram. Motor activity was also depressed. The animals were easily aroused from sleep but continued to be depressed and righting reflexes were decreased. At low dosages, the animals recovered within two hours. When tested for toxicity in rats, none of the animals receiving intraperitoneal injections of 50 milligrams per kilogram of the test compound died. The hydrochloride of 9-(1,4,5,6-tetrahydro-2-pyrimidyl)xanthene produced similar physiological responses in the experimental animal but to a lesser extent. The hydrochloride of 9-(4,5-dihydro-2-imidazolylmethyl)xanthene was studied for its sedative and hypnotic activity at doses of 10 to 100 milligrams per kilogram. At low doses of 10 milligrams, the test compound produced decreased motor activity and depression. At doses in the range of 25 to 50 milligrams, it produced depression and somnolence, the latter lasting for more than two hours. The hypnotic effect of those compounds in the experimental animal differs from that of the barbiturates in that the animals are readily aroused from their sleep. Their motor activity is not as pronouncedly depressed as is usually the case following the administration of barbiturates.

Various modifications, obvious to those skilled in the art, may be made in the present invention without departing from the spirit or scope thereof. Having described and illustrated our invention, we claim:

1. Compounds selected from the group consisting of (A) compounds having the formula:

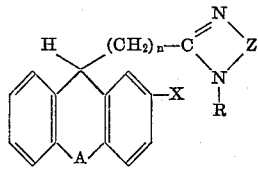

wherein A is a member selected from the group consisting of oxygen and sulfur; X is a member selected from the group consisting of hydrogen and halogen; R is a member selected from the group consisting of hydrogen and lower alkyl; Z is a member selected from the group consisting of ethylene, propylene, isopropylene, isobutylene, hydroxyethylene, hydroxypropylene, hydroxyisopropylene and hydroxyisobutylene; and n is an integer less than four; and (B) the acid addition salts thereof.

2. 9-(4,5-dihydro-2-imidazolylmethyl)xanthene hydrochloride.

3. 10-(1,4,5,6-tetrahydro - 2 - pyrimidylmethyl)thiaxanthene hydrochloride.

4. 9 - (1,4,5,6-tetrahydro-2-pyrimidyl)xanthene hydrochloride.

5. 2-bromo-9-(1,4,5,6-tetrahydro-2-pyrimidyl)xanthene hydrochloride.

6. 10 - [3-(1,4,5,6-tetrahydro-2-pyrimidyl)propyl]thiaxanthene hydrochloride.

References Cited in the file of this patent
UNITED STATES PATENTS

| | | |
|---|---|---|
| 2,868,802 | Hueni | Jan. 13, 1959 |
| 2,919,274 | Sahyun et al. | Dec. 29, 1959 |
| 2,948,724 | Sahyun et al. | Aug. 9, 1960 |

FOREIGN PATENTS

Oxley et al.: J. Chem. Soc., London (1947), pages 497–505.